United States Patent
Harada (10) Patent No.: US 6,174,453 B1
(45) Date of Patent: Jan. 16, 2001

(54) HIGH-DENSITY FERRITE MEMBER AND FERRITE BEADS COMPOSITION THEREFOR

(75) Inventor: Hiroshi Harada, Akita-ken (JP)

(73) Assignee: TDK Corporation, Tokyo (JP)

(*) Notice: Under 35 U.S.C. 154(b), the term of this patent shall be extended for 0 days.

(21) Appl. No.: 09/399,767

(22) Filed: Sep. 21, 1999

(30) Foreign Application Priority Data

Oct. 2, 1998 (JP) .................................................. 10-280764

(51) Int. Cl.[7] .................................................. B28B 13/00
(52) U.S. Cl. .................................. 252/62.54; 252/62.53; 264/611; 264/612; 427/127; 427/220; 428/403; 428/407; 428/900; 23/313 R
(58) Field of Search .......................... 252/62.54, 62.53; 428/403, 407, 700; 427/127, 220; 264/612, 611; 23/313 R (56) References Cited

U.S. PATENT DOCUMENTS 5,132,072 * 7/1992 Fukuoka et al. ...................... 264/319

FOREIGN PATENT DOCUMENTS

| 3-31660 | 5/1991 | (JP) . |
|---|---|---|
| 5-159918 | 6/1993 | (JP) . |
| 7-17460 | 3/1995 | (JP) . |
| 10-29871 | 2/1998 | (JP) . |
| 10-59776 | 3/1998 | (JP) . |

OTHER PUBLICATIONS

Abstract for 3–31660.*

* cited by examiner

*Primary Examiner*—C Melissa Koslow
(74) *Attorney, Agent, or Firm*—Wenderoth, Lind & Ponack, L.L.P.

(57) ABSTRACT

Disclosed is a method for the preparation of a ferrite beads composition suitable for compression-molding into a compression-molded ferrite body to be subjected to a sintering heat treatment to give a sintered ferrite member having usefulness as an electromagnetic material. The method comprises the steps of: forming ferrite beads from ferrite particles and an organic binder compound; and uniformly mixing the ferrite beads with a limited amount of a higher fatty acid ester of a hexitan compound such as sorbitan mono- or sesquioleate. The ferrite beads composition of the invention is advantageous not only in respect of the behavior in compression molding such as high density of the compression-molded body, low withdrawal pressure from the metal mold and a decrease in the phenomenon of springback but also in respect of the properties of the ferrite body after sintering.

16 Claims, 7 Drawing Sheets

HIGH-DENSITY FERRITE MEMBER AND FERRITE BEADS COMPOSITION THEREFOR

BACKGROUND OF THE INVENTION

The present invention relates to a high-density ferrite member and a ferrite beads composition therefor as well as to a method for the preparation of the ferrite beads composition. More particularly, the invention relates to a high-density ferrite member having usefulness as a constituent of electric and electronic devices and a ferrite beads composition used for the preparation of the ferrite member by compression molding as well as a method for the preparation of such a ferrite beads composition.

As is well known, various types of ferrite materials in general are widely employed as a material for the preparation of ferrite members having usefulness as a structural or functional part of a great variety of electronic devices such as electric insulation members and others by utilizing their excellent properties in respect of high heat resistance, chemical stability, mechanical strength, electric insulation, magnetic properties and others.

Such a ferrite member is prepared in most cases by the dry-process compression molding of a ferrite powder-based composition comprising, for example, fine particles of the ferrite material and a binder compound to give a compression-molded body which is then subjected to a sintering heat treatment. Namely, ferrite particles are blended with a binder compound and water to give an aqueous slurry which is spray-dried in a spray drier to give a ferrite beads composition suitable for dry-process compression molding. Alternatively, such a ferrite beads composition is prepared by repeating drying and oscillating extrusion molding for granulation of a mixture of the ferrite particles and an aqueous solution of the binder compound.

In order to be used satisfactorily in the compression molding, the ferrite beads composition is required to have good flowability to ensure rapid and complete filling of a metal mold cavity for compression molding and good collapsibility of the beads under compression from the standpoint of the quality of the ferrite members as well as the productivity of the compression molding process. Proposals are made in Japanese Patent Kokai 5-159918 and Japanese Patent Publication 7-17460 on a method for the preparation of a ceramic beads composition having good flowability and exhibiting good collapsibility of the beads in which the aqueous slurry for the preparation of ceramic beads is admixed with a dispersing agent. Further, a proposal is made in Japanese Patent Publication 3-31660 and Japanese patent Kokai 10-59776 in which a ceramic beads composition is prepared by undertaking a measure to decrease segregation of the binder compound. Japanese Patent Kokai 10-29871 discloses a ceramic beads composition having good moldability in compression molding for the manufacture of sintered ceramic bodies having excellent mechanical properties, in which ceramic particles are blended in an aqueous slurry with a combination of three kinds of binder compounds including a polyvinyl alcohol, a polyethyleneglycol and a higher fatty acid ester of a polyhydric alcohol such as sorbitan stearate and the like.

Though effective to some extent when the ceramic beads composition is prepared by the method of spray-drying granulation of the aqueous slurry, these prior art methods are not very satisfactory when the oscillating extrusion granulation method is applied to the preparation of the ceramic beads composition from an aqueous slurry of the ceramic particles. In addition, these prior art methods have several problems in respect of irreproducibility of the density of the ceramic member prepared from the ceramic beads composition, releasability of the compression-molded body from the metal mold, crack formation in the ceramic member due to the phenomenon of so-called springback of the molded body and durability of the metal mold although certain improvements can be accomplished thereby in the flowability of the ceramic beads composition and collapsibility of the ceramic beads under a relatively low compressive force.

SUMMARY OF THE INVENTION

A primary object of the present invention is accordingly to provide a compression-molded high-density member of a ceramic material or, in particular, ferrite material of high uniformity capable of giving a sintered ferrite member exhibiting excellent electromagnetic properties, which can be prepared by compression molding of a ferrite beads composition with good releasability from the metal mold and without any molding defects such as cracks due to the phenomenon of springback.

A secondary object of the present invention is to provide a ferrite beads composition exhibiting excellent flowability and pressure-transmissivity in compression molding and suitable for compression molding to give compression-molded members without troubles and without decreasing the durability of the metal mold as well as to provide a method for the preparation of such a ferrite beads composition.

Thus, the method of the present invention for the preparation of a ferrite beads composition comprises the steps of:

(a) uniformly blending particles of a ferrite having an average particle diameter in the range from 0.5 to 5 μm with from 0.2 to 10% by weight of an organic binder compound to prepare a ferrite powder mix;

(b) granulating the ferrite powder mix into ferrite beads having an average particle diameter in the range from 0.05 to 0.5 mm; and (c) uniformly mixing the beads of ferrite particles with a higher fatty acid, e.g., oleic, stearic and palmitic acids, ester of a hexitan compound, e.g., sorbitan and mannitan, to form a coating layer on the ferrite beads, the amount of the higher fatty acid hexitan ester being in the range from 0.1 to 3% by weight based on the amount of the ferrite beads consisting of the ferrite particles and the organic binder compound.

The ferrite beads composition accordingly comprises:

(A) ferrite beads having an average particle diameter in the range from 0.05 to 0.5 mm as a conglomeration of a ferrite powder mix comprising particles of a ferrite having an average particle diameter in the range from 0.5 to 5 μm and an organic binder compound in an amount in the range from 0.2 to 10% by weight based on the ferrite particles; and (B) a higher fatty acid ester of a hexitan compound forming a coating layer on the ferrite beads, the amount of the higher fatty acid hexitan ester being in the range from 0.1 to 3% by weight based on the amount of the ferrite beads.

The high-density ferrite member as the primary object of the present invention can readily be obtained by compression-molding of the above defined ferrite beads composition in a metal mold under a compressive force of at least 0.5 ton/cm$^2$.

DETAILED DESCRIPTION OF THE PREFERRED EMBODIMENTS

In step (a) of the inventive method for the preparation of ferrite beads, particles of a ferrite is blended with an organic binder compound to give a ferrite powder mix. The organic binder compound is not particularly limitative and can be selected from those conventionally used in the preparation of ceramic beads for compression molding including polyvinyl alcohols, partial saponification products of polyvinyl acetate, polyacrylic acid, cellulose derivatives such as methyl cellulose, polyacrylamides and the like, of which polyvinyl alcohol is preferable. The amount of the organic binder compound blended with the ferrite powder is in the range from 0.2 to 10 parts by weight or, preferably, from 0.5 to 8 parts by weight or, more preferably, from 0.7 to 5 parts by weight per 100 parts by weight of the ferrite particles.

The method of the invention is applicable to any types of ferrite materials without particular limitations depending on the particularly intended application of the molded ferrite member. If desired, two kinds or more of different ferrite powders can be used in combination. The particles of the ferrite should have an average particle diameter in the range from 0.5 to 5 $\mu$m or, preferably, from 0.7 to 3 $\mu$m.

It is optional according to need that the ferrite powder mix for granulation is admixed with a variety of known additives each in a limited amount. Examples of the optional additives include dispersing agents such as salts of polycarboxylic acid, salts of condensed naphthalenesulfonate and the like, plasticizers such as glycerin, glycol compounds, triol compounds and the like, lubricants such as waxes, stearic acid, salts of stearic acid and the like, organic agglomerating agents such as polyethers, urethane-modified polyethers, polyacrylic acids, modified polyacrylic acids and the like and inorganic agglomerating agents such as aluminum sulfate, aluminum chloride, aluminum nitrate and the like, and so on.

Blending of the ferrite powder with the organic binder compound is performed with addition of water or by using the organic binder compound in the form of an aqueous solution prepared separately. The ferrite powder mix prepared from the ferrite powder and the organic binder compound wet with water is granulated in step (b) into ferrite beads by a known granulating method such as the spray drying method using a spray drier and oscillating extrusion granulation method. The thus prepared ferrite beads should have an average particle diameter in the range from 0.05 to 0.5 mm or, preferably, from 0.07 to 0.3 mm.

In step (c) of the inventive method for the preparation of a ferrite beads composition, the ferrite beads prepared in the above described manner are blended with a higher fatty acid ester of a hexitan compound in a specified proportion.

The higher fatty acid mentioned above, which may be saturated or unsaturated, includes, preferably, stearic, oleic and palmitic acids though not particularly limitative thereto and fatty acid having 12 to 18 carbon atoms in a molecule including lauric, myristic, palmitic, stearic and oleic acids can be used. The hexitan compound is exemplified by sorbitan, mannitan and durcitan, of which sorbitan and mannitan are preferable and sorbitan is more preferable. The term of "hexitan" here implied is for an intraether compound formed by eliminating a molecule of water from a sugar alcohol of hexitol or hexose. It is optional to use two kinds or more of different higher fatty acid hexitan esters in combination. The esterification reaction of a hexitan with a higher fatty acid is effected for a part or all of the hydroxyl groups in a molecule of the hexitan compound. It is of course optional that the hexitan ester is a mixture of partial and full esterification products.

The amount of the higher fatty acid ester of a hexitan compound blended with the ferrite beads is in the range from 0.1 to 3% by weight or, preferably, from 0.2 to 2% by weight or, more preferably, from 0.3 to 1.5% by weight based on the amount of the ferrite beads consisting of the ferrite particles and the organic binder compound. The method for blending of the ferrite beads with the higher fatty acid hexitan ester can be performed by the following method, though not particularly limitative thereto. For example, the ferrite beads are admixed with a solution prepared by dissolving the higher fatty acid hexitan ester in a suitable organic solvent such as alcohols, toluene and the like and they are blended together in a drum mixer and the like followed by drying. Alternatively, the ferrite beads are kept in fluidization in a suitable fluidizing apparatus and the solution is added thereto by spraying to effect coating of the ferrite beads. It is also possible that the ferrite beads and the hexitan ester are dry-blended by using a suitable blending machine.

A preferable embodiment for practicing the inventive method is as follows. Thus, a powder of the ferrite is granulated into beads having an average particle diameter of 0.1 to 0.3 mm by a known granulation method such as the spray drier method, spray granulation method and oscillating extrusion granulation method. The ferrite beads are then blended with a fatty acid ester of a hexitan compound by the above described procedure to form a coating layer of the hexitan ester compound on at least 30% of the surface of the ferrite beads although it is desirable that whole surface of the ferrite beads is coated with the hexitan ester compound. There would be no particular disadvantages even if a part of the hexitan ester compound forming the coating layer infiltrates into the surface layer of the ferrite beads.

The ferrite beads composition prepared in the above described manner can be shaped by compression molding in a metal mold into a molded ferrite body useful as a precursor of an electromagnetic material obtained by sintering. The molding pressure in this compression molding is in the range from 0.5 to 5 tons/cm$^2$ or, preferably, in the range from 1 to 4 tons/cm$^2$. The density of the thus obtained molded ferrite body is, though dependent on the types of the ferrite material and other factors, in the range from 3.0 to 4.0 g/cm$^3$ when the ferrite material is a nickel/copper/zinc-based ferrite. The molded ferrite body exhibits good releasability from the metal mold requiring a relatively low withdrawal pressure from the metal mold. In addition, the molded body withdrawn from the metal mold exhibits a decrease in the phenomenon of springback so that the molded body is free from occurrence of cracks, fissures and other molding defects to ensure high electromagnetic properties. This unexpected advantage is due to the surface activity of the fatty acid hexitan ester resulting in improvements of the lubricity, flowability and pressure-transmissivity of the ferrite beads to ensure good impregnability to a metal mold cavity and a decreased molding pressure contributing to extension of the durability of the metal mold along with a decrease in the withdrawal pressure of the molded body from the metal mold as well as a decrease in the phenomenon of springback more or less unavoidable in the molded body discharged out of the metal mold.

The compression-molded ferrite body can be sintered by a heat treatment at a temperature in the range from 800 to 1400° C. or, preferably, in the range from 1000 to 1300° C.

In the following, the present invention is described in more detail by way of Examples and Comparative Examples which, however, never limit the scope of the invention in any way.

EXAMPLE 1

A slurried ferrite powder mix was prepared by uniformly blending, in a wet-process grinding-mixing machine, 66 parts by weight of nickel/copper/zinc-based ferrite particles having an average particle diameter of 1 μm, 34 parts by weight of water, 1.0 part by weight of a polyvinyl alcohol as a binder and 0.25 part by weight of an ammonium polycarboxylate as a dispersing agent. This ferrite powder slurry was subjected to spray granulation in a spray drier to give ferrite beads of spherical particle configuration having an average particle diameter of 0.125 mm.

The ferrite beads were then admixed with a 50% by weight ethanol solution of sorbitan sesquioleate in an amount of 1.0% by weight based on the ferrite beads and they were rotaryblended in a drum mixer to give a ferrite beads composition which was free from any coarse agglomerates.

A 1.2 g portion of the ferrite beads composition was compression-molded in the cavity of a metal mold having a diameter of 6.0 mm under a compressive pressure varied in the range from 0.5 to 4 tons/cm$^2$ to give a cylindrical molded body of 12 to 14 mm length free from cracks and other molding defects. The molded bodies could be discharged from the metal mold under a remarkably decreased withdrawal pressure.

Separately, a durability test of the metal mold was undertaken for molding of pellets of 1.3 mm diameter and 1.5 mm height by using the same ferrite beads composition in a metal mold under a molding pressure of about 3 tons/cm$^2$ to find that as many as 1.2 million shots of compression molding could be performed using a single metal mold without any noticeable damage or wearing of the metal mold.

Figure 1A:
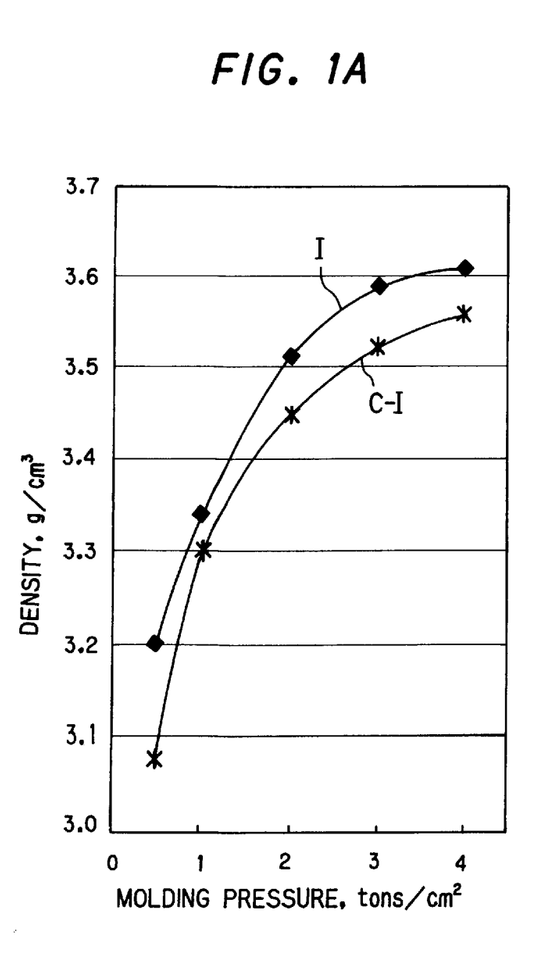
FIGS. 1A and 1B are each a graph showing the density of the compression-molded body prepared in some of Examples 1 to 5 and Comparative Examples 1 to 5 as a function of the compression-molding pressure.
Figure 2A:
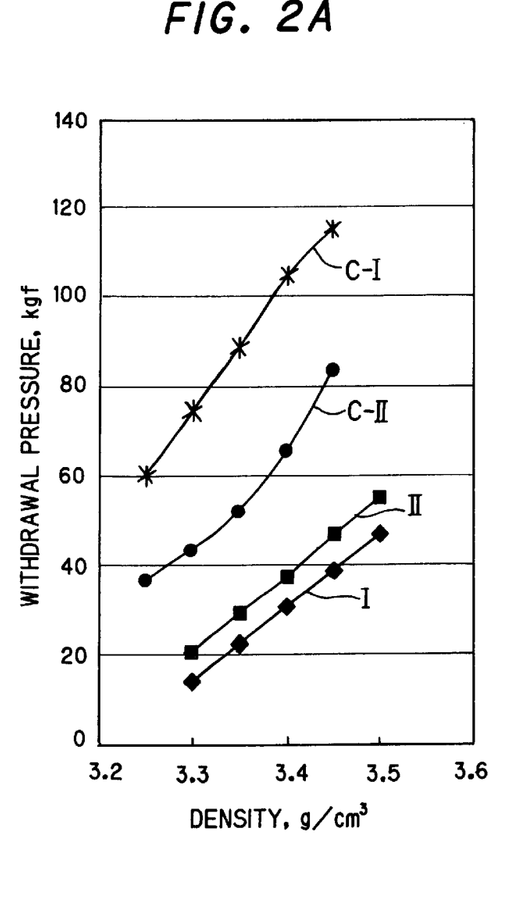
FIGS. 2A and 2B are each a graph showing the withdrawal pressure of the molded body from the metal mold in some of Examples 1 to 5 and Comparative Examples 1 to 5 as a function of the density of the molded body.
Figure 3A:
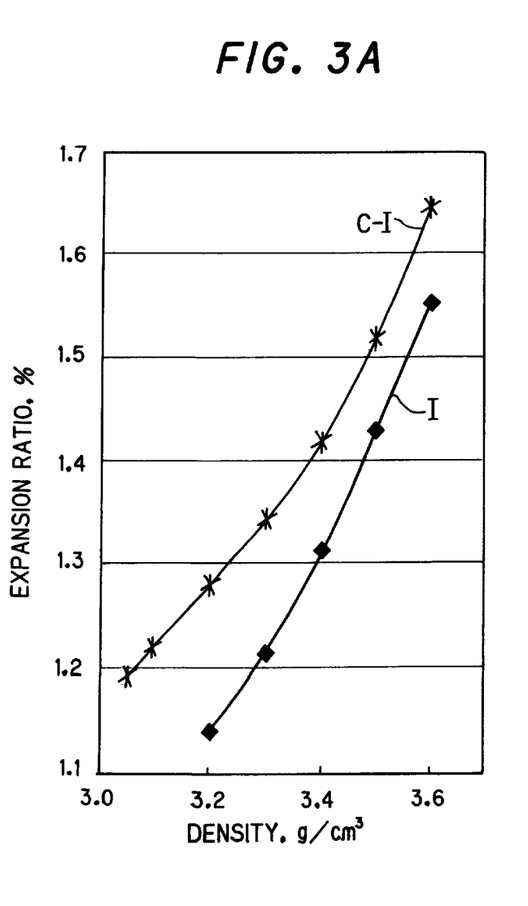
FIGS. 3A and 3B are each a graph showing the expansion ratio of the molded body taken out of the metal mold in some of Examples 1 to 5 and Comparative Examples 1 to 5 as a function of the density of the molded body.

FIGS. 1A, 2A and 3A show, each by the curve I, the relationship between the molding pressure and the density of the molded ferrite body, between the density of the molded ferrite body and the withdrawal pressure from the metal mold and between the density of the molded ferrite body and the expansion ratio, i.e. extent of springback, of the molded body, respectively.

Figure 4A:
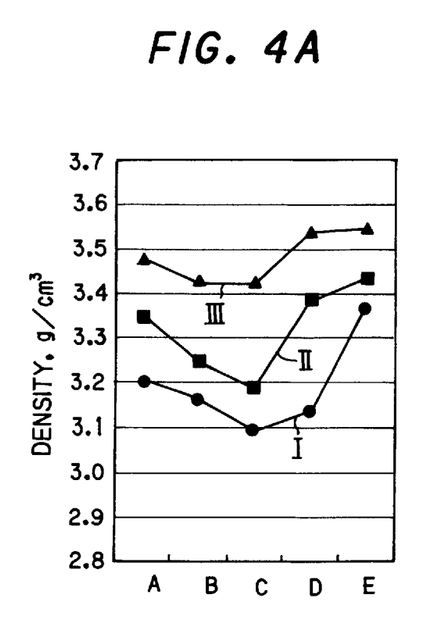
FIGS. 4A, 4B and 4C are each a graph showing the density distribution of the molded rod-formed body prepared under different molding pressures in Example 1, Comparative Example 1 and Comparative Example 2, respectively.

In order to examine variation in the density distribution of the molded body, rod-formed molded bodies having a diameter of 6 mm and a length of 20 to 22 mm were prepared each from a 2.0 g portion of the ferrite beads composition under a molding pressure of 0.5, 1.0 or 2.0 tons/cm$^2$. FIG. 4A shows distribution of the density of the molded bodies divided into five equal portions A, B, C, D and E along the length of the rod by the curves I, II and III for the molding pressure of 0.5, 1.0 and 2.0 tons/cm$^2$, respectively.

EXAMPLE 2

The experimental procedure was substantially the same as in Example 1 excepting for a decrease of the sorbitan ester solution from 1.0% by weight to 0.6% by weight.

FIG. 2A shows, by the curve II, the relationship between density of the molded body and the withdrawal pressure from the metal mold. The graphs showing the relationships between the molding pressure and density of the molded body and between the density and expansion ratio of the molded body were each very close to and substantially overlapped the respective curve I in FIGS. 1A and 3A, respectively, for Example 1.

EXAMPLE 3

The experimental procedure was substantially the same as in Example 1 excepting for replacement of the sorbitan sesquioleate solution with the same amount of a 50% by weight ethanol solution of sorbitan monooleate.

The graph corresponding to the curve I in each of FIGS. 1A, 2A and 3A was very close to and substantially overlapped the respective curve I for Example 1.

EXAMPLE 4

The experimental procedure was substantially the same as in Example 3 excepting for a decrease in the amount of the sorbitan ester solution from 1.0% by weight to 0.6% by weight.

The graphs showing the relationships between the molding pressure and density of the molded body and between the density and expansion ratio of the molded body were each very close to and substantially overlapped the curve I in FIG. 1A and curve I in FIG. 3A, respectively, for Example 1. The graph showing the relationship between the density and withdrawal pressure of the molded body was very close to and substantially overlapped the curve II in FIG. 2A for Example 2. Comparative Example 1.

The experimental procedure was substantially the same as in Example 1 except that the ferrite beads as prepared were as such subjected to compression molding into a molded ferrite body.

Figure 4B:
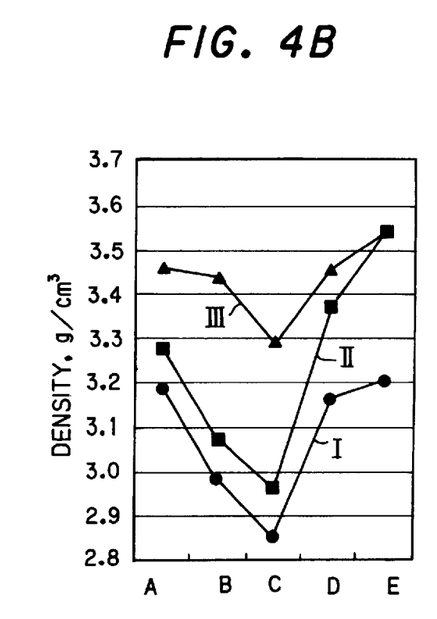
Figure 4C:
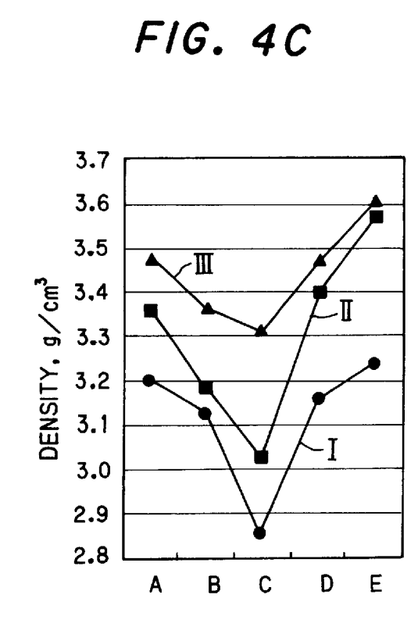

FIGS. 1A, 2A and 3A show, each by the curve C-I, the relationship between the molding pressure and the density of the molded body, between the density of the molded body and the withdrawal pressure from the metal mold and between the density of the molded body and the expansion ratio, i.e. extent of springback, of the molded body, respectively. Similarly to FIG. 4A, FIG. 4B shows density distribution of the molded body prepared under varied molding pressures of 0.5, 1.0 and 2.0 tons/cm² and divided into five portions along the length of the rod-formed molded body by the curves I, II and III, respectively.

These results indicated that the ferrite beads as prepared were inferior in the lubricity and pressure-transmissivity so that the molded bodies suffered a decrease in the density, especially, when the molding pressure was low along with an increased variation in the density distribution.

In addition, the withdrawal pressure of the molded body from the metal mold was noticeably higher than in Example 1 to be accompanied by metal mold squeaks, especially, when the molding pressure was high resulting in occurrence of stratal cracks.

Comparative Example 2

The experimental procedure was substantially the same as in Example 1 except that the 50% by weight ethanol solution of sorbitan sesquioleate was replaced with a fine dry powder of zinc stearate in an amount of 0.1% by weight based on the ferrite beads.

FIG. 2A shows, by the curve C-II, the relationship between the density of the molded body and the withdrawal pressure. The graphs showing the relationship between the molding pressure and the density of the molded body and between the density of the molded body and the expansion ratio, i.e. extent of springback, of the molded body were each very close to and substantially overlapped the curve C-I in each of FIGS. 1A and 3A, respectively, for Comparative Example 1.

As is understood from these results, addition of zinc stearate had an effect to improve the mold-releasability of the molded ferrite body with a decrease in the withdrawal pressure but the molded body still suffered a decrease in the density along with a large non-uniformity in the density distribution.

The durability test of the metal mold undertaken in the same manner as in Example 1 by repeating molding of ferrite pellets failed to continue over 800 thousand shots because the molded pellets no longer passed the tests for the appearance and dimensions due to wearing of the metal mold even though the metal mold was free from noticeable damages by visual inspection.

Example 5

A blend of 100 parts by weight of a nickel/copper/zinc-based ferrite powder having an average particle diameter of 1 μm and 17 parts by weight of a 6% by weight aqueous solution of a polyvinyl alcohol was granulated into a granulated powder by using an agitating granulator (Model TM Mixer, manufactured by Mitsui Kozan Co.). After drying on a belt drier machine, the granulated powder was subjected to oscillation-extrusion granulation in an oscillating granulating disintegrator (manufactured by Nippon Seiki Co.) followed by screening in a shifter to give ferrite beads having an average particle diameter of 0.250 mm. The ferrite beads were admixed with a 50% by weight ethanol solution of sorbitan sesquioleate in an amount of 1.0% by weight based on the amount of the dry ferrite beads by using a drum mixer to give a ferrite beads composition containing no agglomerates.

A 1.2 g portion of the ferrite beads composition was compression-molded in a metal mold under a molding pressure of 0.5 to 4.0 tons/cm² to give a cylindrical molded body having a diameter of 6 mm and length of 12 to 14 mm.

Figure 1B:
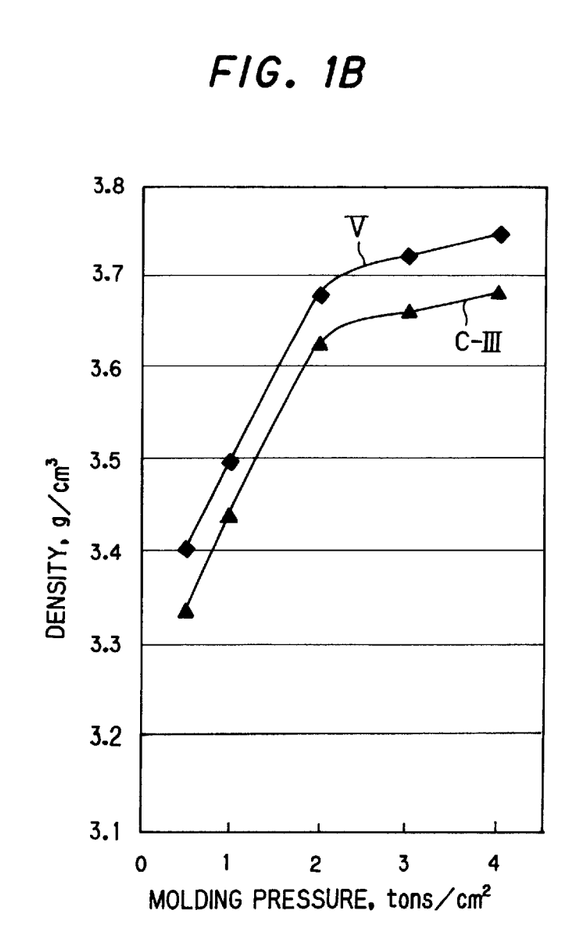
Figure 2B:
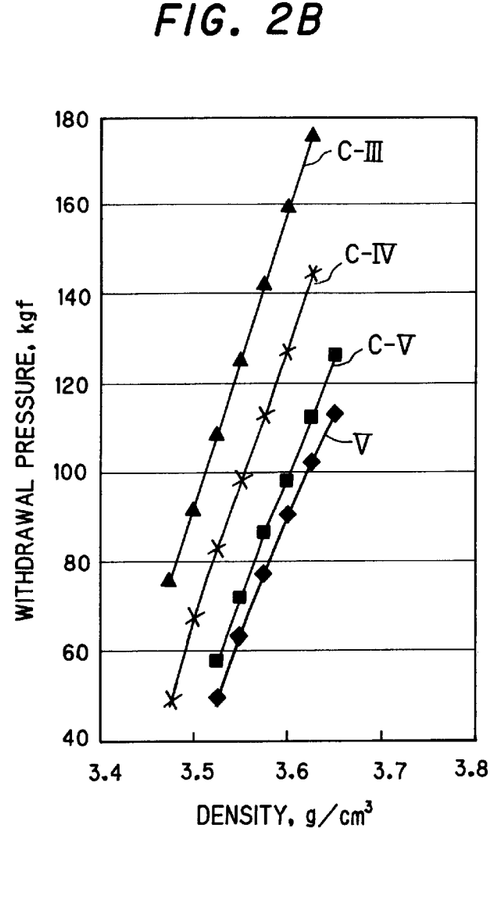
Figure 3B:
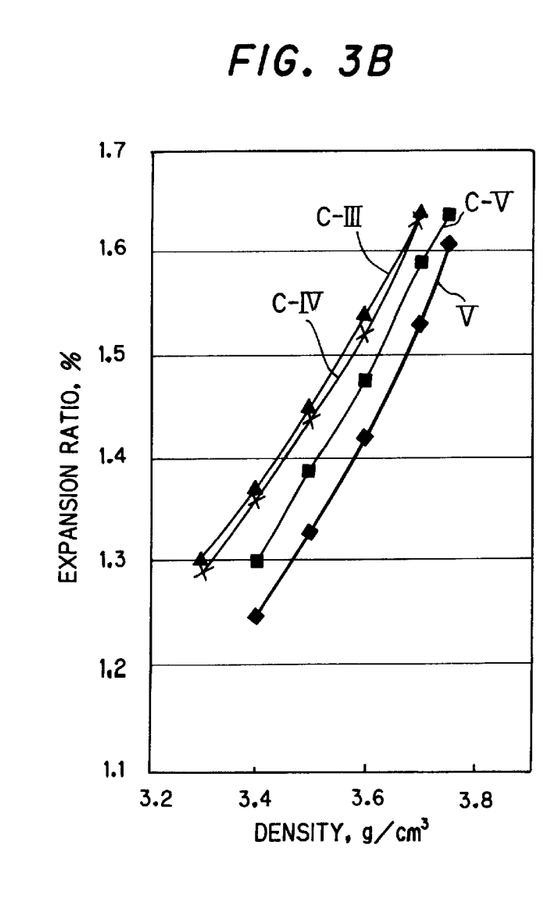

FIGS. 1B, 2B and 3B show, each by the curve V, the relationship between the molding pressure and the density of the molded body, between the density of the molded body and the withdrawal pressure from the metal mold and between the density of the molded body and the expansion ratio thereof after withdrawal from the metal mold, respectively.

Comparative Example 3

The experimental procedure was substantially the same as in Example 5 except that the cylindrical molded body was prepared from the ferrite beads having an average particle diameter of 0.250 mm as such without addition of the ethanol solution of sorbitan sesquioleate.

FIGS. 1B, 2B and 3B show, each by the curve C-III, the relationship between the molding pressure and the density of the molded body, between the density of the molded body and the withdrawal pressure from the metal mold and between the density of the molded body and the expansion ratio thereof, respectively.

It is clear by making comparison with Example 5 that addition of sorbitan sesquioleate to the ferrite beads was effective in increasing the density of the molded body, decreasing the withdrawal pressure and decreasing the expansion ratio in addition to suppression of metal mold squeaks during withdrawal of the molded body from the metal mold and occurrence of stratal fissures in the molded body as were the case, especially, when the molding pressure was high.

Comparative Example 4

The experimental procedure was substantially the same as in Example 5 excepting for replacement of the ethanol solution of sorbitan sesquioleate with fine particles of zinc stearate in an amount of 0.1% by weight based on the amount of the ferrite beads.

The graph showing the relationship between the molding pressure and the density of the molded body was very close to and substantially overlapped the curve C-III in FIG. 1B for Comparative Example 3. FIGS. 2B and 3B show, each by the curve C-IV, the relationship between the density of the molded body and the withdrawal pressure from the metal mold and between the density of the molded body and the expansion ratio thereof, respectively.

Comparative Example 5

The experimental procedure was substantially the same as in Example 5 except that the compression molding of the cylindrical molded body was undertaken by using ferrite beads prepared by blending 100 parts by weight of the ferrite powder, 17 parts by weight of a 6% by weight aqueous solution of a polyvinyl alcohol and 1.0 part by weight of sorbitan sesquioleate.

The graph showing the relationship between the molding pressure and the density of the molded body was very close to and substantially overlapped the curve V in FIG. 1B for Example 5. FIGS. 2B and 3B show, each by the curve C-V, the relationship between the density of the molded body and the withdrawal pressure from the metal mold and between the density of the molded body and the expansion ratio thereof, respectively.

EXAMPLE 6 and Comparative Example 6

The ferrite beads compositions prepared in Examples 1 to 5 and Comparative Examples 1 to 5 were each compression molded under a molding pressure of 1.0 ton/cm² into a ring-formed molded body having an outer diameter of 21 mm, inner diameter of 12 mm and height of 7 mm.

The molded bodies were subjected to a sintering heat treatment in air for 2 hours at a temperature of 1030° C. 1050° C., 1070° C. or 1090° C. to give ring-formed magnetic cores with a linear shrinkage of about 15%.

Figure 5A:
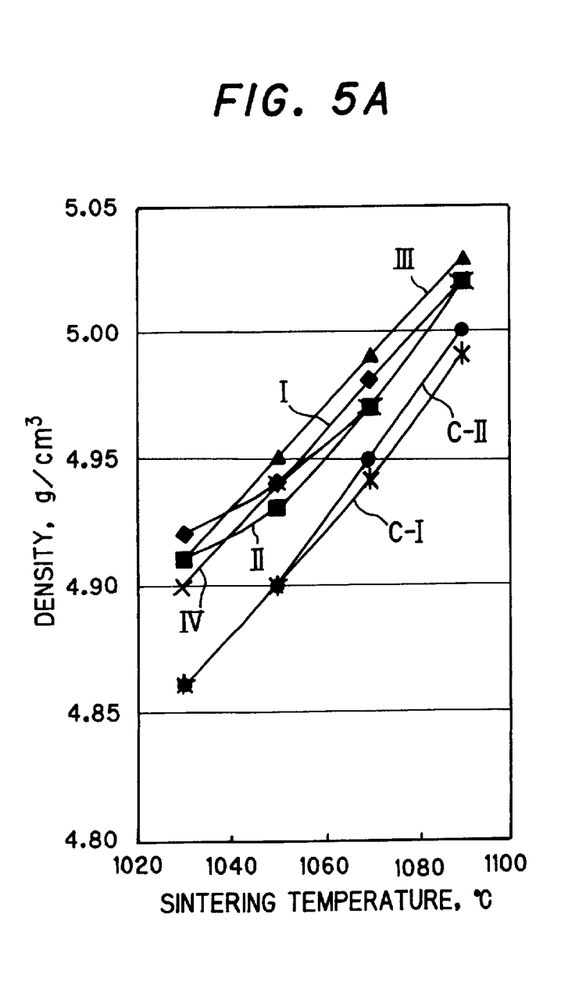
FIGS. 5A and 5B are each a graph showing the density of the sintered ferrite bodies prepared in Example 6 and Comparative Example 6 from the ferrite beads compositions prepared in Examples 1 to 5 and Comparative Examples 1 to 5 as a function of the sintering temperature.
Figure 5B:
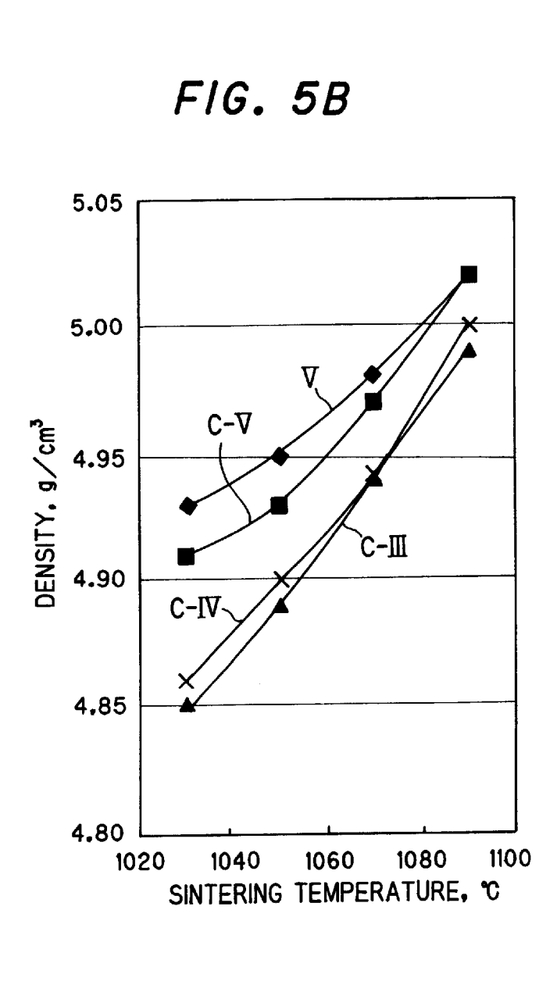

These sintered core samples were subjected to the measurement of the density according to the Archimedes method. The results are shown graphically in FIGS. 5A and 5B as a function of the sintering temperature by the curves I to V for the ferrite beads compositions of Examples 1 to 5, respectively, and by the curves C-I to C-V for the ferrite beads or beads compositions used Comparative Examples 1 to 5, respectively.

Figure 6A:
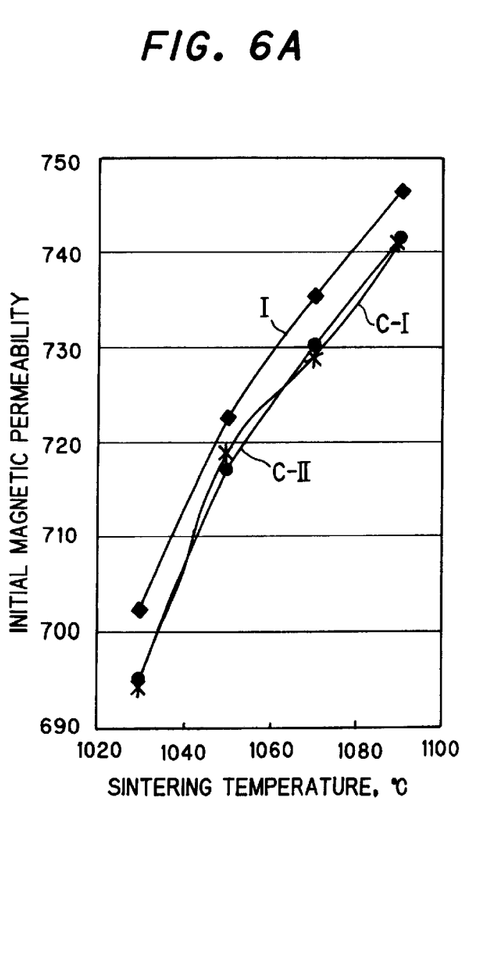
FIGS. 6A and 6B are each a graph showing the initial magnetic permeability of the sintered ferrite bodies prepared in Example 6 and Comparative Example 6 from the ferrite beads compositions prepared in some of Examples 1 to 5 and Comparative Examples 1 to 5 as a function of the sintering temperature.
Figure 6B:
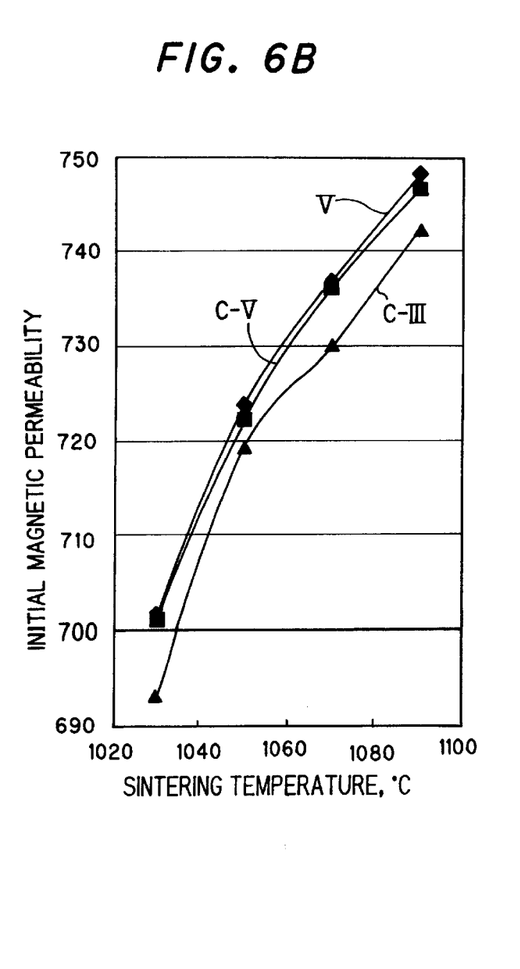

Further, measurement of the initial magnetic permeability was undertaken of these samples by using an LCR meter (Model 4274A, manufactured by Hewlett Packard Co.) at a frequency of 100 kHz. The results are shown graphically in FIGS. 6A and 6B as a function of the sintering temperature by the curves I, V, C-I, C-II, C-III and C-V for the ferrite beads compositions of Examples 1 and 5 and of Comparative Examples 1, 2, 3 and 5, respectively. The curves for Examples 2 to 4 were each very close to and substantially overlapped the curve I for Example 1. The curve for Comparative Example 4 was very close to and substantially overlapped the curve C-III for Comparative Example 3.

EXAMPLE 7 and Comparative Example 7.

Figure 7A:
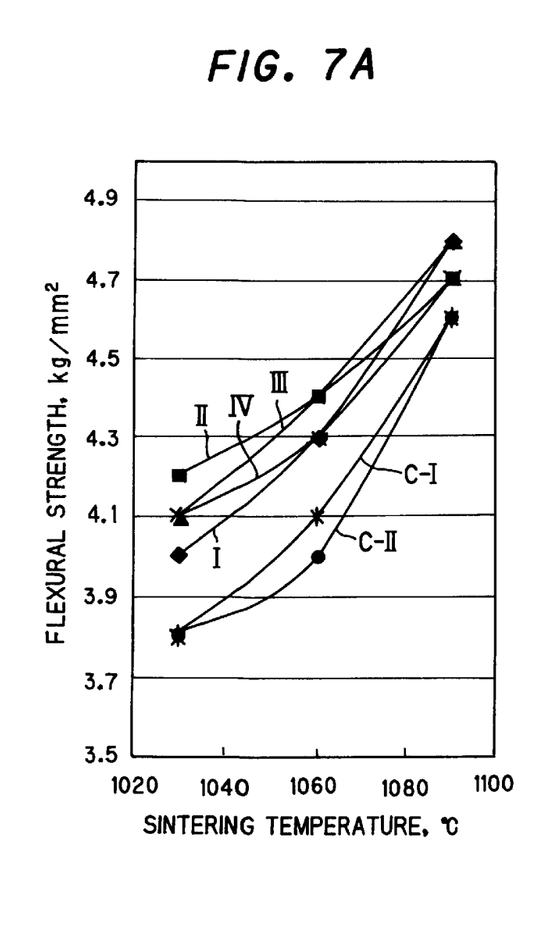
FIGS. 7A and 7B are each a graph showing the flexural strength of the sintered ferrite bodies prepared in Example 7 and Comparative Example 7 from the ferrite beads compositions prepared in Examples 1 to 5 and Comparative Examples 1 to 5 as a function of the sintering temperature.
Figure 7B:
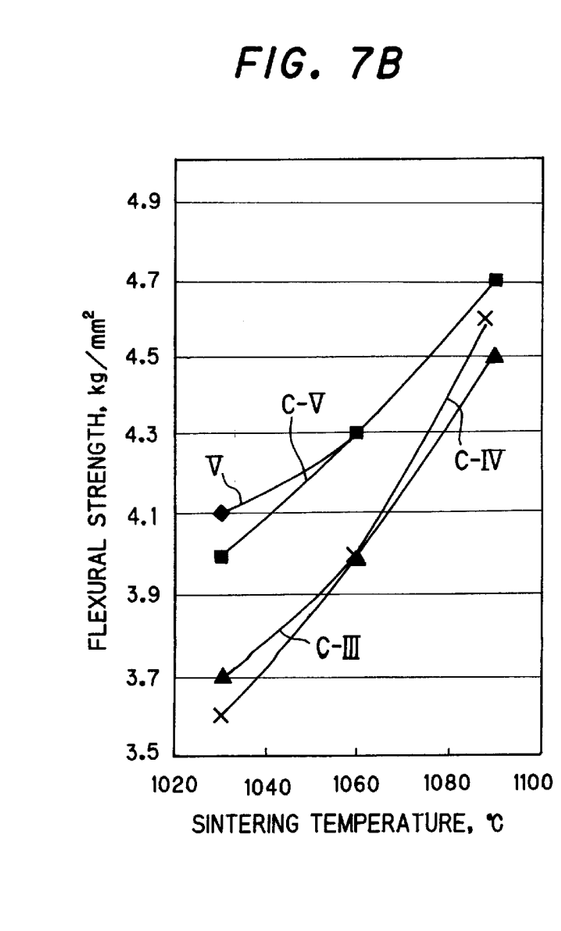

Measurement of the flexural strength of sintered ferrite bodies were undertaken according to the procedure specified in JIS R 1601 for the test specimens obtained by compression molding and sintering of the ferrite beads compositions prepared in Examples 1 to 5 and Comparative Examples 1 to 5. Thus, each of the ferrite beads compositions was compression-molded under a pressure of 1.0 ton/cm$^2$ into a molded body of 55 mm length, 12 mm width and 5 mm thickness. The molded bodies were subjected to a sintering heat treatment for 2 hours at 1030° C., 1060° C. or 1090° C. The results of the measurements are shown graphically in FIGS. 7A and 7B as a function of the sintering temperature by the curves I to V for the beads compositions in Examples 1 to 5, respectively, and by the curves C-I to C-V for the beads compositions in Comparative Examples 1 to 5, respectively.

What is claimed is:

1. A method for the preparation of a ferrite beads composition which comprises the steps of:
   (a) uniformly blending particles of a ferrite having an average particle diameter in the range from 0.5 to 5 µm with from 0.2 to 10% by weight of an organic binder compound to prepare a ferrite powder mix;
   (b) granulating the ferrite powder mix into ferrite beads having an average particle diameter in the range from 0.05 to 0.5 mm; and
   (c) uniformly mixing the beads of ferrite particles with a fatty acid ester of a hexitan compound to form a coating layer on the ferrite beads, the amount of the fatty acid hexitan ester being in the range from 0.1 to 3% by weight based on the amount of the ferrite beads consisting of the ferrite particles and the organic binder compound.

2. The method for the preparation of a ferrite beads composition as claimed in claim 1 in which the organic binder compound used in step (a) is selected from the group consisting of polyvinyl alcohol, partial saponification product of polyvinyl acetate, polyacrylic acid, methyl cellulose and polyacrylamide.

3. The method for the preparation of a ferrite beads composition as claimed in claim 2 in which the organic binder compound used in step (a) is polyvinyl alcohol.

4. The method for the preparation of a ferrite beads composition as claimed in claim 1 in which the amount of the organic binder compound used in step (a) is in the range from 0.7 to 5% by weight based on the ferrite particles.

5. The method for the preparation of a ferrite beads composition as claimed in claim 1 in which the ferrite particles have an average particle diameter in the range from 0.7 to 3 µm.

6. The method for the preparation of a ferrite beads composition as claimed in claim 1 in which the ferrite beads prepared in step (b) have an average particle diameter in the range from 0.07 to 0.3 mm.

7. The method for the preparation of a ferrite beads composition as claimed in claim 1 in which the fatty acid forming an ester with the hexitan compound has from 12 to 18 carbon atoms in a molecule.

8. The method for the preparation of a ferrite beads composition as claimed in claim 7 in which the fatty acid forming an ester with the hexitan compound is selected from the group consisting of lauric acid, myristic acid, palmitic acid, stearic acid and oleic acid.

9. The method for the preparation of a ferrite beads composition as claimed in claim 1 in which the hexitan compound is selected from the group consisting of sorbitan, mannitan and durcitan.

10. The method for the preparation of a ferrite beads composition as claimed in claim 9 in which the hexitan compound is sorbitan.

11. The method for the preparation of a ferrite beads composition as claimed in claim 1 in which the amount of the fatty acid ester of a hexitan compound is in the range from 0.2 to 2% by weight based on the ferrite beads.

12. A ferrite beads composition which comprises:
   (A) ferrite beads having an average particle diameter in the range from 0.05 to 0.5 mm as a conglomeration of a ferrite powder mix comprising particles of a ferrite having an average particle diameter in the range from 0.5 to 5 µm and an organic binder compound in an amount in the range from 0.2 to 10% by weight based on the ferrite particles; and
   (B) a fatty acid ester of a hexitan compound forming a coating layer on the ferrite beads, the amount of the fatty acid hexitan ester being in the range from 0.1 to 3% by weight based on the amount of the ferrite beads.

13. The ferrite beads composition as claimed in claim 12 in which the ferrite beads have an average particle diameter in the range from 0.07 to 0.3 mm.

14. The ferrite beads composition as claimed in claim 12 in which the ferrite particles have an average particle diameter in the range from 0.7 to 3 µm.

15. The ferrite beads composition as claimed in claim 12 in which the fatty acid forming an ester with the hexitan compound is selected from the group consisting of lauric acid, myristic acid, palmitic acid, stearic acid and oleic acid.

16. The ferrite beads composition as claimed in claim 12 in which the hexitan compound is selected from the group consisting of sorbitan, mannitan and dulcitan.

* * * * *